United States Patent
Qiu et al.

(10) Patent No.: US 12,237,551 B2
(45) Date of Patent: Feb. 25, 2025

(54) METHOD AND SYSTEM EMPLOYING FUEL CELL STACK POWER MODEL IN CONTROLLING FUEL CELL SYSTEM

(71) Applicant: Ford Global Technologies, LLC, Dearborn, MI (US)

(72) Inventors: Zeng Qiu, Grosse Pointe Woods, MI (US); Rajit Johri, San Francisco, CA (US); Hao Wang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 17/669,824

(22) Filed: Feb. 11, 2022

(65) Prior Publication Data
US 2023/0261228 A1 Aug. 17, 2023

(51) Int. Cl.
*H01M 8/04858* (2016.01)
*B60L 50/70* (2019.01)
*B60L 58/30* (2019.01)
*H01M 8/04537* (2016.01)
*H01M 8/04992* (2016.01)
*H01M 16/00* (2006.01)

(52) U.S. Cl.
CPC ......... *H01M 8/0491* (2013.01); *B60L 50/70* (2019.02); *B60L 58/30* (2019.02); *H01M 8/04589* (2013.01); *H01M 8/0494* (2013.01); *H01M 8/04992* (2013.01); *H01M 16/006* (2013.01); *H01M 2250/20* (2013.01)

(58) Field of Classification Search
CPC .............. H01M 8/04298–04313; H01M 8/04537–04694; H01M 8/04858–04953
See application file for complete search history.

(56) References Cited

U.S. PATENT DOCUMENTS

| | | | |
|---|---|---|---|
| 10,249,890 B2 | 4/2019 | Procter et al. | |
| 2005/0244688 A1* | 11/2005 | Suzuki | H01M 8/04559 429/432 |
| 2007/0141416 A1* | 6/2007 | Kilian | H01M 8/04619 429/432 |
| 2008/0152962 A1* | 6/2008 | Poonamallee | H01M 8/04738 429/513 |
| 2009/0197125 A1* | 8/2009 | Salvador | H01M 8/04619 429/432 |
| 2010/0248054 A1* | 9/2010 | Umayahara | H01M 10/44 429/432 |
| 2015/0288007 A1 | 10/2015 | Gangwar et al. | |
| 2017/0144647 A1 | 5/2017 | Gutruf et al. | |
| 2018/0198145 A1* | 7/2018 | Watanabe | B60L 58/40 |
| 2021/0104763 A1* | 4/2021 | Cingoz | H01M 8/04932 |

* cited by examiner

*Primary Examiner* — Jonathan Crepeau
*Assistant Examiner* — Jacob Buchanan
(74) *Attorney, Agent, or Firm* — David B. Kelley; Brooks Kushman P.C.

(57) ABSTRACT

A system includes a fuel cell stack (FCS) and a controller. The controller adjusts a stack current of the FCS to a desired amount to cause the FCS to provide a power commensurate with a power request. The controller employs a stack power model of the FCS in adjusting the stack current.

15 Claims, 4 Drawing Sheets

METHOD AND SYSTEM EMPLOYING FUEL CELL STACK POWER MODEL IN CONTROLLING FUEL CELL SYSTEM

TECHNICAL FIELD

The present invention relates to controlling a fuel cell system.

BACKGROUND

A fuel cell is an electrochemical device that converts chemical energy of a fuel, e.g., hydrogen, and an oxidizing agent, e.g., oxygen, into electrical energy, with water as a byproduct. A fuel cell stack is a series connection of fuel cells. A fuel cell system includes one or more fuel cell stacks. The fuel cell system may be used in a vehicle to provide electrical energy for vehicle propulsion.

SUMMARY

A system includes a fuel cell stack (FCS) and a controller. The controller is configured to adjust a stack current of the FCS to a desired amount to cause the FCS to provide a power commensurate with a power request. The controller employs a power model of the FCS in adjusting the stack current.

The controller may be further configured to generate a stack current request for the desired amount of stack current and to control the FCS according to the stack current request to thereby adjust the stack current to meet the stack current request whereby the FCS provides the power commensurate with the power request.

The controller may be further configured to generate the stack current request for the desired amount of stack current according to a comparison of the power request and the power provided by the FCS.

In embodiments, the power model of the FCS is configured to provide an estimate of the power that the FCS will provide in response to being controlled according to the stack current request; and the controller is further configured to generate the stack current request for the desired amount of stack current based on the estimate of the power that the FCS will provide in response to being controlled according to the stack current request.

The power model of the FCS may include a plurality of estimates of the power that the FCS will provide in response to being controlled according to respective stack current requests.

The controller may be further configured to adjust the power request according to a difference between the power provided by the FCS and the estimate of the power that the FCS will provide.

In embodiments, the controller employs dynamic feedforward processing of the adjusted power request to generate the stack current request. The dynamic feedforward processing may be implemented as inverse of the power model of the FCS and includes a first order filter $1/(\tau s+1)$, where i is a calibratable parameter.

The controller may be further configured to generate the power request as being a gross power request for a sum total of a net power request and an auxiliary power request. The auxiliary power request is indicative of an auxiliary power consumed by the FCS in providing power. In this case, the power provided by the FCS commensurate with the gross power request is a gross power commensurate with a sum total of (i) a net power commensurate with the net power request and (ii) the auxiliary power.

The controller may be further configured to generate the net power request based on a driver power demand, whereby the gross power provided by the FCS commensurate with the gross power request tracks the driver power demand.

The power provided by the FCS commensurate with the power request may be used as power for propelling a vehicle.

A vehicle includes an FCS, a net power controller, and a gross power controller. The FCS is configured to provide power for propulsion of the vehicle. The power provided by the FCS is dependent on a stack current of the FCS. The net power controller is configured to generate a gross power request for a sum total of a net power request and an auxiliary power request. The net power request is in proportion to a driver power demand for propelling the vehicle. The auxiliary power request is indicative of an auxiliary power consumed by the FCS in providing power for propulsion of the vehicle. The gross power controller is configured to adjust the stack current of the FCS to a desired amount to cause the FCS to provide a gross power that is commensurate with the gross power request and that tracks the driver power demand. The gross power controller employs a stack power model of the FCS in adjusting the stack current.

A method for use with an FCS includes adjusting a stack current of the FCS to a desired amount to cause the FCS to provide a power commensurate with a power request. The method further includes employing a power model of the FCS in adjusting the stack current.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
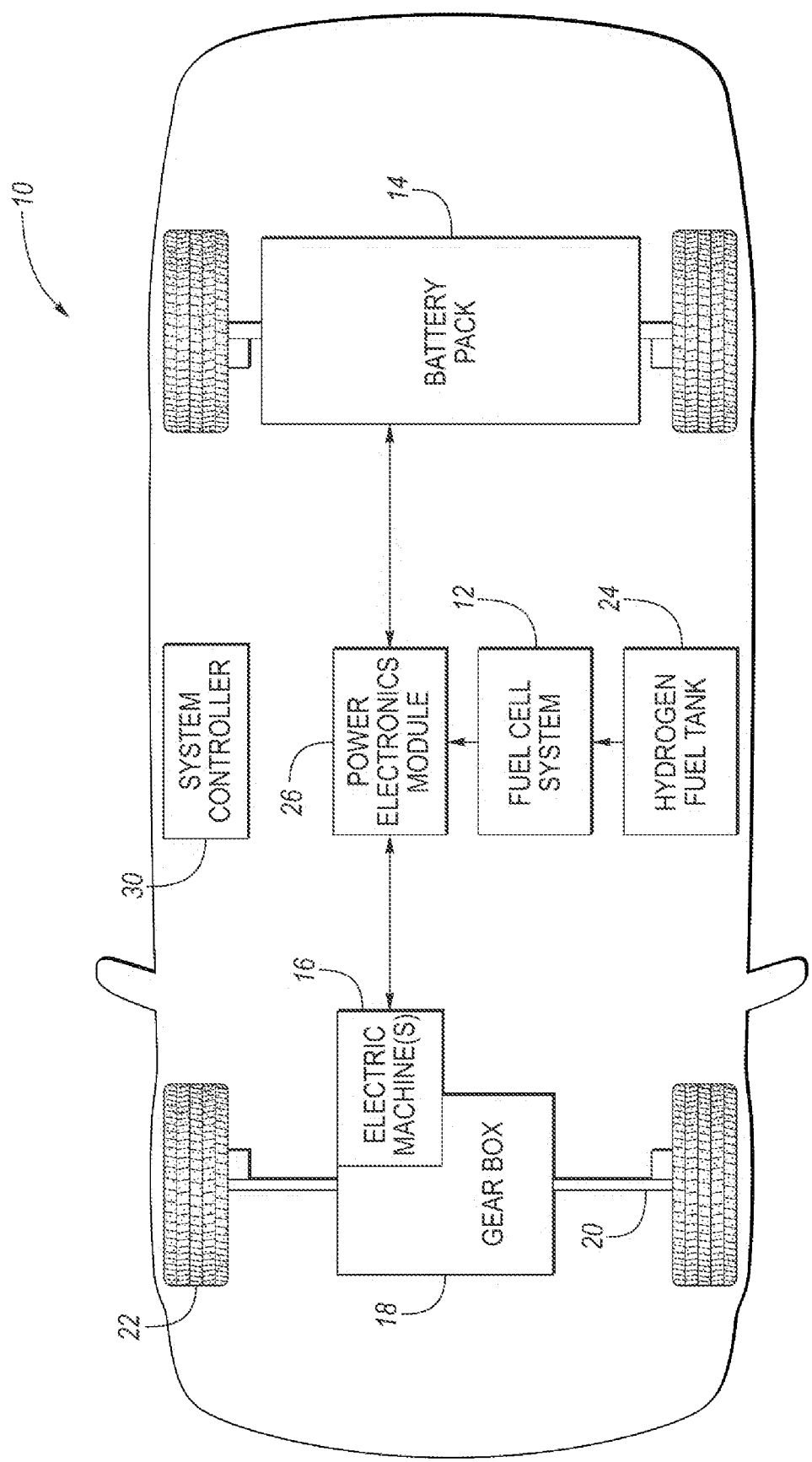
FIG. 1 illustrates a block diagram of an exemplary fuel cell electric vehicle having a fuel cell system ("FCS") and a traction battery both for providing electrical energy for vehicle propulsion, the FCS having a fuel cell stack comprised of fuel cells connected in series.

Referring now to FIG. 1, a block diagram of an exemplary fuel cell electric vehicle ("FCEV") 10 having a fuel cell system ("FCS") 12 and a traction battery ("battery") 14 is shown. FCS 12 and traction battery 14 are individually operable for providing electrical energy for propulsion of FCEV 10.

FCS 12 includes one or more fuel cell stacks (not shown). Each fuel cell stack (also "FSC" where noted) is comprised of a plurality of fuel cells electrically connected in series (not shown). For simplicity, FCS 12 is described herein as having one fuel cell stack. FCS 12 further includes auxiliary equipment such as an electric compressor for FCS air supply. The auxiliary equipment operates in order for FCS 12 to provide electrical energy.

FCEV 10 further includes one or more electric machines 16 mechanically connected to a transmission 18. Electric machine 16 is capable of operating as a motor and as a generator. Transmission 18 is mechanically connected to a drive shaft 20 mechanically connected to wheels 22 of FCEV 10. Electric machine 16 can provide propulsion and slowing capability for FCEV 10. Electric machine 16 acting as a generator can recover energy that may normally be lost as heat in a friction braking system.

FCS 12 is configured to convert hydrogen from a hydrogen fuel tank 24 of FCEV 10 into electrical energy. The electrical energy from FCS 12 is for use by electric machine 16 for propelling FCEV 10. FCS 12 is electrically connected to electric machine 16 via a power electronics module 26 of FCEV 10. Power electronics module 26, having an inverter or the like, provides the ability to transfer electrical energy from FCS 12 to electric machine 16. For example, FCS 12 provides direct current (DC) electrical energy while electric machine 16 may require three-phase alternating current (AC) electrical energy to function. Power electronics module 26 converts the electrical energy from FCS 12 into electrical energy having a form compatible for operating electric machine 16. In this way, FCEV 10 is configured to be propelled with use of electrical energy from FCS 12.

Battery 14 stores electrical energy for use by electric machine 16 for propelling FCEV 10. Battery 14 is also electrically connected to electric machine 16 via power electronics module 26. Power electronics module 26 provides the ability to bi-directionally transfer electrical energy between battery 14 and electric machine 16. For example, battery 14 may also provide DC electrical energy while electric machine 16 may require the three-phase AC electrical energy to function. Power electronics module 26 converts the electrical energy from battery 14 into electrical energy having the form compatible for operating electric machine 16. In this way, FCEV 10 is further configured to be propelled with the use of battery 14. Further, in a regenerative mode, power electronics module 26 converts AC electrical energy from electric machine 16 acting as a generator to the DC electrical energy form compatible with battery 14.

FCS 12 and battery 14 may have one or more associated controllers to control and monitor the operation thereof. The controllers can be microprocessor-based devices. The controllers may communicate via a serial bus (e.g., Controller Area Network (CAN)) or via discrete conductors.

For example, a vehicle system controller (VSC) 30 is configured to coordinate the operation of FCS 12 and battery 14 and may be further configured to control the FCS and/or the battery accordingly.

Figure 2:
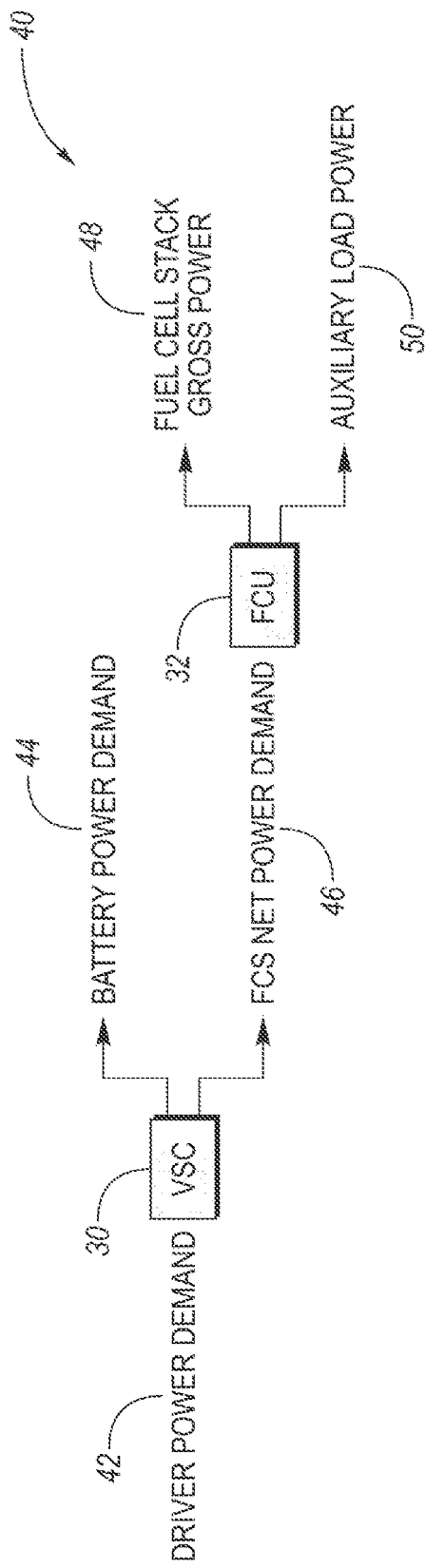
FIG. 2 illustrates a process diagram for coordinating operation of the FCS and the traction battery in providing electrical energy for vehicle propulsion.

Referring now to FIG. 2, with continual reference to FIG. 1, a process diagram 40 for coordinating operation of FCS 12 and battery 14 in providing electrical energy for propulsion of FCEV 10 is shown. In response to a driver power demand (request) 42 for propelling FCEV 10, vehicle system controller 30 interprets and splits the driver power demand into a battery power demand (request) 44 and an FCS net power demand (request) 46. In turn, battery 14 is controlled by a controller of the battery to provide (i.e., output, deliver, etc.) electrical power commensurate with battery power request 44 for use in propelling FCEV 10. Similarly, FCS 12 is controlled by a controller 32 (e.g., a fuel cell control unit (FCU)) of the FCS to provide (i.e., output, deliver, etc.) electrical power satisfying FCS net power request 46 for use in propelling FCEV 10.

Controller 32 controls FCS 12 to provide more electrical power than electrical power commensurate with net power request 46. The electrical power commensurate with net power request 46 is a "net" electrical power. Controller 32 controls FCS 12 to provide more electrical power than the net electrical power because the FCS consumes electrical energy in operating to provide electrical power. Particularly, the auxiliary equipment of FCS 12, such as an electric compressor of the FCS, operate for the FCS to provide electrical power and the auxiliary equipment consumes electrical energy in order to operate. FCS 12 is to provide the electrical energy consumed by the auxiliary equipment.

As such, in controlling FCS 12 to provide a net electrical power commensurate with net power request 46 for use in propelling FCEV 10, controller 32 controls the FCS to provide additional electrical power commensurate with the electrical power consumed by the auxiliary equipment. The additional electrical power commensurate with the electrical power consumed by the auxiliary equipment is an auxiliary load power 50.

Accordingly, in response to net power request 46, controller 32 controls FCS 12 to provide a "gross" electrical power commensurate with an FCS gross power 48, where the gross power (or "fuel cell stack gross power" or "gross power" or "stack power") is the summation of (i) the net power (or "fuel cell stack net power") (i.e., the delivered amount of electrical power commensurate with net power request 46) and (ii) auxiliary load power 50 (or "auxiliary power" or "auxiliary load") (i.e., the delivered amount of electrical power consumed by the auxiliary equipment). That is, gross power=net power+auxiliary power.

As noted above, the fuel cells of the fuel cell stack of FCS 12 are connected in series and, for simplicity, the FCS is described as having one fuel cell stack. As the fuel cells are connected in series, the electrical voltage of the fuel cell stack ("fuel cell stack voltage" or "stack voltage") is a summation of the voltages of the fuel cells of the fuel cell stack; and each fuel cell has the same current and the current of the fuel cell stack ("fuel cell stack current" or "stack current") is the same as the current of each of the fuel cells. Hence, gross power 48 delivered by FCS 12 is equal to the stack voltage multiplied by the stack voltage, i.e., gross power=stack voltage*stack current.

In sum, in response to driver power demand 42, vehicle system controller 30 demands net power from FCS 12, while controller 32 controls the FCS to deliver the net power considering the auxiliary load. By drawing a stack current from the fuel cell stack, FCS 12 produces the net power, which is the gross power minus the auxiliary load. As noted, the gross power is the stack current multiplied by the stack voltage and the auxiliary load is mainly the power consumed by the electric compressor for FCS air supply.

Figure 3:
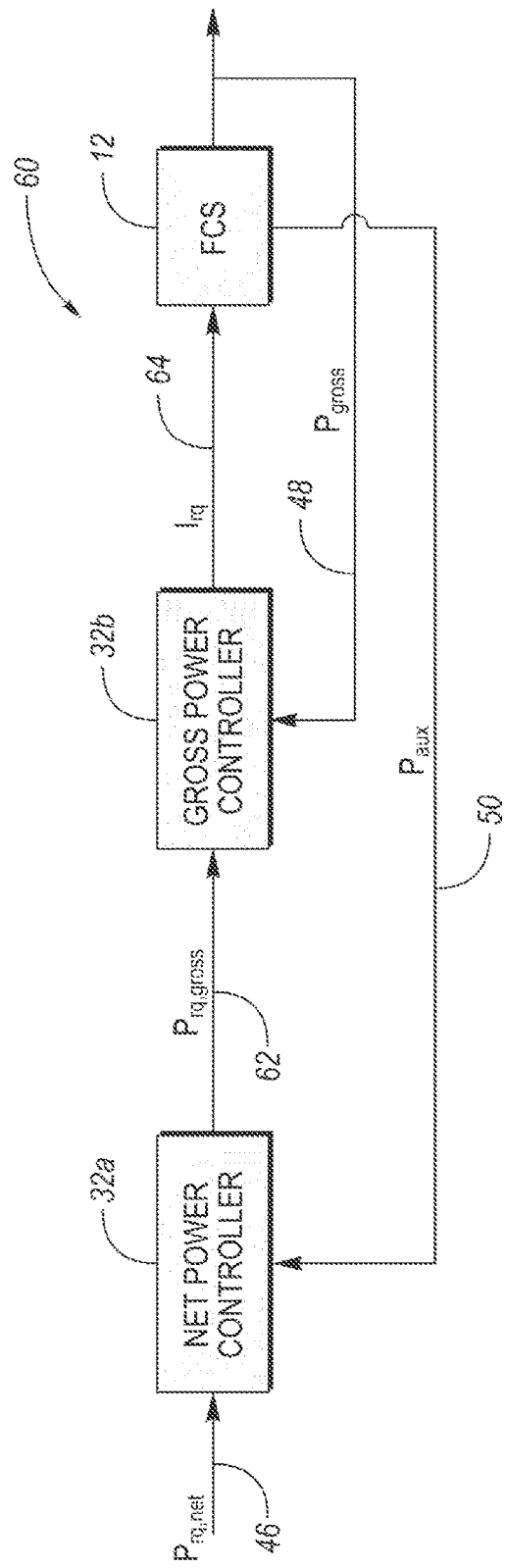
FIG. 3 illustrates a block diagram of a feedback control algorithm for controlling the FCS to provide a gross power commensurate with a sum total of (i) a net power commensurate with a net power request and (ii) an auxiliary power.

Referring now to FIG. 3, with continual reference to FIG. 2, a block diagram of a feedback control algorithm 60 for controlling FCS 12 to provide a gross power 48 commensurate with a sum total of (i) a net power commensurate with a net power request 46 and (ii) an auxiliary power 50 is shown. Feedback control algorithm 60 is implemented by controller 32 of FCS 12. Controller 32 is shown in FIG. 3 as including a net power controller 32a and a gross power controller 32b.

In operation, in response to a net power request 46, net power controller 32a generates a gross power request 62 according to a sum total of (i) the requested net power indicated by net power request 46 and (ii) auxiliary power 50 consumed by FCS 12. Auxiliary power 50 is measured by a sensor (not shown) which provides a signal indicative of the auxiliary power to net power controller 32a. Net power controller 32a provides gross power request 62 to gross power controller 32b.

In response to gross power request 62, gross power controller 32b feedback adjusts the stack current to a desired amount to cause FCS 12 to deliver the requested gross power. Gross power controller 32b generates a stack current demand (request) 64 for the desired amount of stack current according to a comparison of (i) the requested gross power (i.e., gross power request 62) and (ii) the actual gross power delivered by FCS 12 (i.e., gross power 48). Gross power 48 delivered by FCS 12 is measured by a sensor (not shown). This sensor provides to gross power controller 32b a signal indicative of gross power 48. Gross power controller 32b controls FCS 12 according to stack current request 64 to thereby adjust the stack current to meet the stack current request whereby FCS 12 delivers gross power 48 commensurate with gross power request 62.

As described, net power controller 32a calculates gross power request 62 from net power request 46 and auxiliary power 50. If gross power 48 tracks gross power request 62, then the net power (which is gross power 48 minus auxiliary power 50) will track net power request 46 utilizing this logic.

In this exemplary embodiment in which FCS 12 has one fuel cell stack, the power delivered by the fuel cell stack is gross power 48 (or "stack power") delivered by the FCS, the stack current (i.e., the current of the fuel cell stack) is the current of the gross power delivered by the FCS, and the stack voltage (i.e., the voltage of the fuel cell stack) is the voltage of the gross power delivered by the FCS.

A power control issue of FCS 12 involving feedback control algorithm 60 is that gross power controller 32b is to generate stack current request 64 in such a manner that the net power delivered by the FCS tracks net power request 46 quickly and robustly, and thereby tracks driver power demand 42 quickly and robustly.

The power control issue of FCS 12 thus involves generating stack current request 64 in meeting net power request 46. This is an issue because, after being generated, stack current request 64 is used to schedule all lower-level control logic of FCS 12. Therefore, performance and robustness of the generation of stack current request 64 are factors in FCS 12 quickly and robustly meeting its driver power demand 42 responsibilities and providing a smooth operation of the FCS.

Methods and systems in accordance with embodiments of the present invention employ a fuel cell stack power model ("stack power model") of FCS 12 in controlling the FCS to provide a gross power. The provided gross power is commensurate with a sum total of (i) a net power commensurate with a net power request and (ii) an auxiliary power commensurate with an auxiliary power consumed by FCS 12 in operating to provide the gross power. For any given stack current request, the stack power model of FCS 12 outputs an estimate of the stack power (or "gross power") that the FCS will provide in response to being controlled according to the given stack current request. The methods and systems in controlling FCS 12 feedback adjust the stack current according to a difference between (i) the actual gross power 48 delivered by the FCS and (ii) the estimated stack power (or estimated gross power) that the FCS will deliver, as estimated by the stack power model. The use of the stack power model thereby remedies the above noted power control issue of FCS 12 as the stack current request is generated in such a manner that the net power delivered by the FCS tracks the net power request quickly and robustly, and thereby tracks the corresponding driver power demand quickly and robustly.

Figure 4:
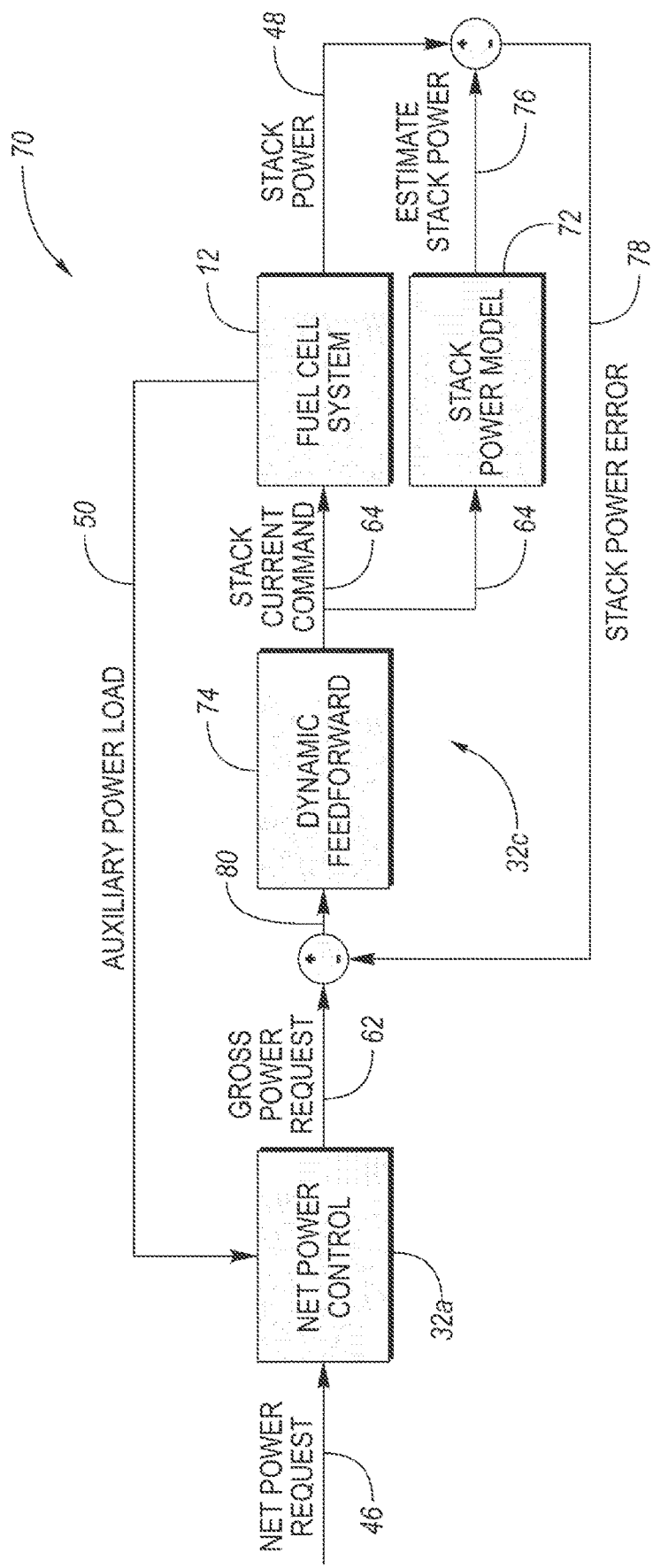
FIG. 4 illustrates a block diagram of another feedback control algorithm for controlling the FCS to provide a gross power commensurate with a sum total of (i) a net power commensurate with a net power request and (ii) an auxiliary power, this feedback control algorithm employing a fuel cell stack power model in controlling the FCS.

Referring now to FIG. 4, with continual reference to FIG. 3, a block diagram of another feedback control algorithm 70 for FCS 12 to provide a gross power commensurate with a sum total of (i) a net power commensurate with net power request 46 and (ii) auxiliary power 50 is shown. Feedback control algorithm 70 employs a stack power model of FCS 12 in controlling the FCS. Feedback control algorithm 70 is implemented by controller 32 of FCS 12. As shown in FIG. 4, just like with feedback control algorithm 60 shown in FIG. 3, controller 32 includes net power controller 32a. However, as further shown in FIG. 4, unlike feedback control algorithm 60 shown in FIG. 3, controller 32 includes a gross power controller in the form of a gross power control stage 32c.

In operation of feedback control algorithm 70, just like with feedback control algorithm 60 of FIG. 3, in response to a net power request 46, net power controller 32a generates a gross power request 62 according to a sum total of (i) the requested net power and (ii) auxiliary power 50. Net power controller 32a provides gross power request 62 to gross power control stage 32c.

In response to gross power request 62, just like with feedback control algorithm 60 of FIG. 3, gross power control stage 32c generates a stack current request 64 for the desired amount of stack current and feedback adjusts the stack current to the desired amount to cause FCS 12 to deliver the requested gross power.

However, unlike feedback control algorithm 60 of FIG. 3, gross power control stage 32c utilizes an internal model control (IMC) architecture in generating stack current request 64. The IMC architecture includes a stack power model 72 and a dynamic feedforward processing block (logic) 74.

Stack power model 72 is a model of the fuel cell stack of FCS 12. As FCS 12 is described herein for simplicity as having one fuel cell stack, stack power model 72 is a model of FCS 12. In response to any viable stack current request 64, stack power model 72 is configured to output an estimated stack power (or "estimated gross power") 76 that FCS 12 will provide in response to being controlled according to the stack current request. That is, in response to a given stack current request 64, stack power model 72 outputs a corresponding estimated stack power 76. The corresponding estimated stack power 76 being an estimate of the gross power that FCS 12 will provide in response to being controlled according to the given stack current request 64.

Stack power model 72 is implemented with a look-up table from stack current request to stack power and any delay in the system (for example, computation time delay, CAN bus delay, etc.). Stack power model 72 is implemented with the noted look-up table as fuel cell dynamics from stack current to stack voltage are extremely fast. In this regard, the voltage of each fuel cell of the fuel cell stack of FCS 12 depends inversely on the current of the fuel cell. As such, a change in the stack current, resulting from FCS 12 being controlled according to an adjusted stack current request 64, causes a change in the stack voltage which thereby changes actual gross power 48 delivered by the FCS as the delivered gross power is the product of the stack current multiplied by the stack voltage.

Gross power control stage 32c feedback adjusts the stack current to the desired amount according to a difference between (i) actual gross power 48 delivered by FCS 12 and (ii) estimated stack power 76 that the FCS will deliver, as estimated by stack power model 72. This difference between (i) actual gross power 48 and (ii) estimated stack power 76 is labeled "stack power error" 78 in feedback control algorithm 70 of FIG. 4.

Stack power error 78, i.e., the difference between (i) actual gross power 48 and (ii) estimated stack power 76, is fed back to dynamic feedforward processing block 74. More particularly, a difference between gross power request 62 and stack power error 78 is fed back to dynamic feedforward processing block 74. This difference between (i) gross power request 62 and (ii) stack power error 78 is an adjusted gross power request 80. Adjusted gross power request 80 is provided to dynamic feedforward processing block 74 in place of gross power request 62. In this way, the difference between (i) actual gross power 48 and (ii) estimated stack power 76 is fed back to dynamic feedforward processing block 74.

Dynamic feedforward processing block 74 is implemented by the inverse of the look-up table of stack power model 72 and a first order filter $$\frac{1}{\tau s + 1},$$

where τ is a calibratable parameter that determines the bandwidth of the closed-loop, gross power control stage 32c.

In response to an adjusted gross power request 80, dynamic feedforward processing block 74 processes the adjusted gross power request to provide a stack current request 64 corresponding to the adjusted gross power request. Gross power control stage 32c controls FCS 12 according to stack current request 64 to thereby adjust the stack current to meet the stack current request whereby FCS 12 delivers gross power 48 commensurate with adjusted gross power request 80. Dynamic feedforward processing block 74 also provides stack current request 64 corresponding to adjusted gross power request 80 to stack power model 72. In response to stack current request 64, stack power model 72 provides estimated stack power 76 corresponding to stack current request 64. Actual gross power 48 and estimated stack power 76 are compared to detect stack power error 78. Stack power error 78 is fed back to generate a new adjusted gross power request 80 according to the closed-loop process of gross power control stage 32c. In this way, gross power control stage 32c generates stack current request 64 in such a manner that the net power delivered by FCS 12 tracks net power request 46 quickly and robustly, and thereby tracks the corresponding driver power demand quickly and robustly.

Figure 5:
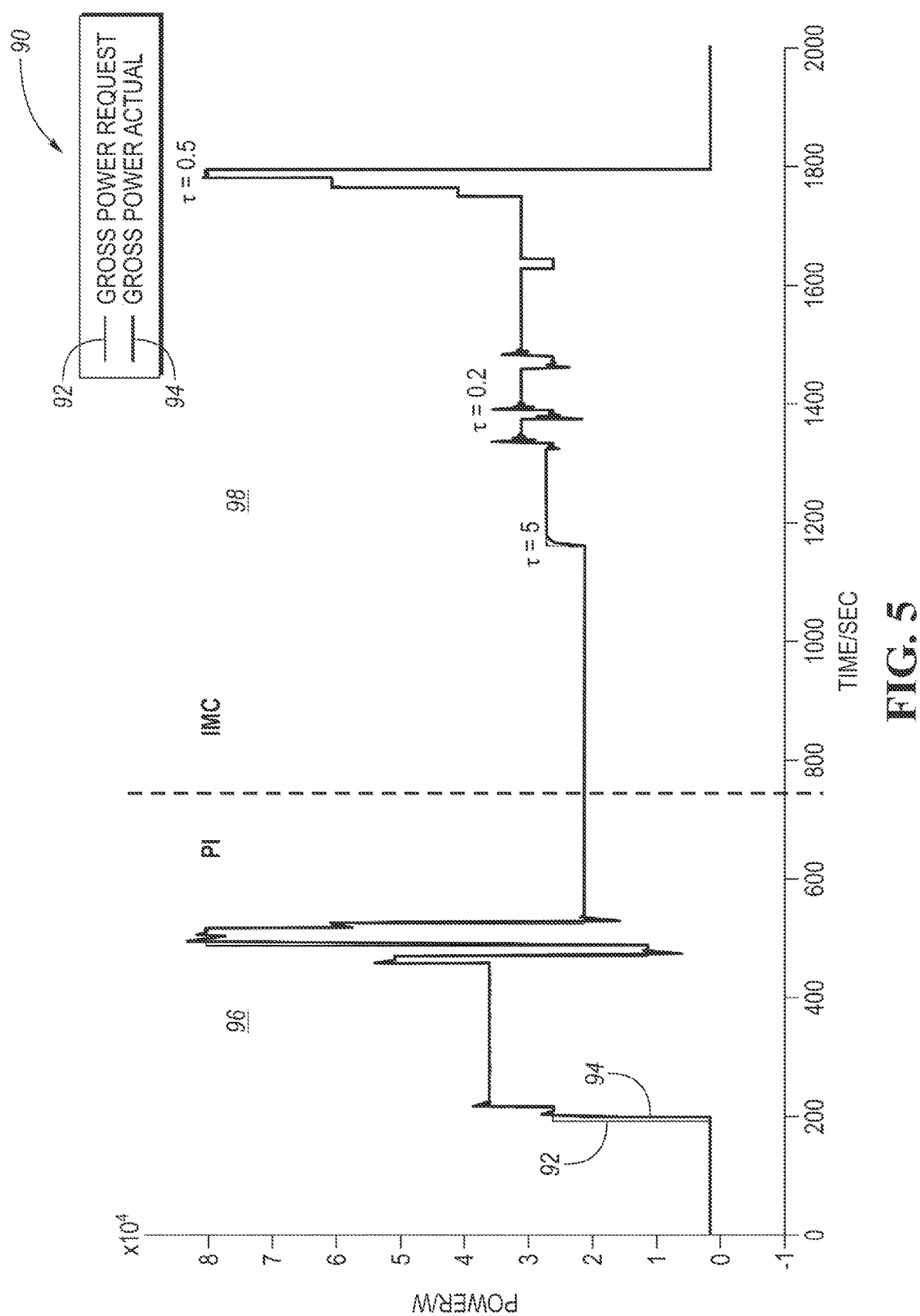
FIG. 5 illustrates a graph having an experimental plot of a gross power request for the FCS and an experimental plot of a gross power delivered by the FCS over a time interval, wherein in an initial portion of the time interval the FCS is controlled according to the feedback control algorithm shown in FIG. 3 and in a subsequent portion of the time interval the FCS is controlled according to the feedback control algorithm shown in FIG. 4.

Referring now to FIG. 5, with continual reference to FIGS. 3 and 4, a graph 90 having an experimental plot 92 of a gross power request 62 for FCS 12 and an experimental plot 94 of a gross power 48 delivered by the FCS over a time interval is shown. In an initial portion 96 of the time interval, FCS 12 is controlled according to feedback control algorithm 60 shown in FIG. 3. In a subsequent portion 98 of the time interval, FCS 12 is controlled according to feedback control algorithm shown 70 in FIG. 4.

As described, feedback control algorithm 60 shown in FIG. 3 involves a proportional-integral (PI) controller with anti-windup. As indicated by experimental plots 92 and 94 in initial portion 96 of the time interval, the gain-scheduled PI is relatively difficult to tune and has some overshoot.

As described, feedback control algorithm 70 shown in FIG. 4 involves the internal model control (IMC) with stack power model 72 and dynamic feedforward processing block 74. As indicated by experimental plots 92 and 94 in subsequent portion 98 of the time interval, the IMC provides relatively easy calibration, steady state tracking, elegant handling of delay, and simple input constraint.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system comprising:
a fuel cell stack (FCS); and
a controller having a power model of the FCS that is configured to provide an estimated power that the FCS will output in response to being controlled according to a given stack current request, the estimated power being different than an actual power that the FCS outputs in response to being controlled according to the given stack current request; and
the controller configured to adjust a stack current of the FCS to a desired amount to cause the FCS to provide a power commensurate with a power request, wherein the controller employs the power model of the FCS in adjusting the stack current by adjusting the power request according to a difference between the estimated power that the FCS will output in response to being controlled according to a request for the stack current and the actual power that the FCS outputs in response to being controlled according to the request for the stack current.

2. The system of claim 1 wherein:
the controller is further configured to generate the request for the stack current and to control the FCS according to the request for the stack current request to thereby adjust the stack current to meet the request for the stack current.

3. The system of claim 2 wherein:
the controller employs dynamic feedforward processing of the adjusted power request to generate the request for the stack current.

4. The system of claim 3 wherein:
the dynamic feedforward processing is implemented as inverse of the power model of the FCS and includes a first order filter 1/(τs+1), where τ is a calibratable parameter.

5. The system of claim 1 wherein:
the power model of the FCS includes a plurality of estimated powers that the FCS will provide in response to being controlled according to respective stack current requests.

6. The system of claim 1 wherein:
the controller is further configured to generate the power request as being a gross power request for a sum total of a net power request and an auxiliary power request, the auxiliary power request being indicative of an auxiliary power consumed by the FCS in providing power, whereby the power provided by the FCS commensurate with the gross power request is a gross power commensurate with a sum total of (i) a net power commensurate with the net power request and (ii) the auxiliary power.

7. The system of claim 6 wherein:
the controller is further configured to generate the net power request based on a driver power demand, whereby the gross power provided by the FCS commensurate with the gross power request tracks the driver power demand.

8. The system of claim 1 wherein:
the power provided by the FCS commensurate with the power request is used as power for propelling a vehicle.

9. A vehicle comprising:
a fuel cell stack (FCS) configured to provide power for propulsion of the vehicle, the power provided by the FCS being dependent on a stack current of the FCS;
a net power controller configured to generate a gross power request for a sum total of a net power request and an auxiliary power request, the net power request being in proportion to a driver power demand for propelling the vehicle and the auxiliary power request being indicative of an auxiliary power consumed by the FCS in providing power for propulsion of the vehicle; and
a gross power controller having a stack power model of the FCS that is configured to provide an estimated power that the FCS will output in response to being controlled according to a given stack current request, the estimated power being different than an actual power that the FCS outputs in response to being controlled according to the given stack current request, the gross power controller configured to adjust the stack current of the FCS to a desired amount to cause the FCS to provide a gross power that is commensurate with the gross power request and that tracks the driver power demand, wherein the gross power controller employs a the stack power model of the FCS in adjusting the stack current by adjusting the power request according to a difference between the estimated power that the FCS will output in response to being controlled according to a request for the stack current and the actual power that the FCS outputs in response to being controlled according to the request for the stack current.

10. The vehicle of claim 9 further comprising:
a traction battery configured to provide power for propulsion of the vehicle; and
wherein the driver power demand is a sum total of the net power request and a traction battery power request, and the traction battery is controlled to provide a power that is commensurate with the traction battery power request.

11. The vehicle of claim 9 wherein:
the gross power controller is further configured to generate a-the request for the stack current and to control the FCS according to the request for the stack current request to thereby adjust the stack current to meet the request for the stack current.

12. The vehicle of claim 11 wherein:
the gross power controller employs dynamic feedforward processing of the adjusted power request to generate the request for the stack current.

13. A method for use with a fuel cell stack (FCS), the method comprising:
providing a power model of the FCS that is configured to provide an estimated power that the FCS will output in response to being controlled according to a given stack current request, the estimated power being different than an actual power that the FCS outputs in response to being controlled according to the given stack current request;
adjusting a stack current of the FCS to a desired amount to cause the FCS to provide a power commensurate with a power request; and
employing a the power model of the FCS in adjusting the stack current by adjusting the power request according to a difference between the estimated power that the FCS will output in response to being controlled according to a request for the stack current and the actual power that the FCS outputs in response to being controlled according to the request for the stack current.

14. The method of claim 13 further comprising:
generating the power request as being a gross power request for a sum total of a net power request and an auxiliary power request, the auxiliary power request being indicative of an auxiliary power consumed by the FCS in providing power, whereby the power provided by the FCS commensurate with the gross power request is a gross power commensurate with a sum total of (i) a net power commensurate with the net power request and (ii) the auxiliary power.

15. The method of claim 14 further comprising:
generating the net power request based on a driver power demand, whereby the gross power provided by the FCS commensurate with the gross power request tracks the driver power demand.

\* \* \* \* \*